US012745326B2

(12) United States Patent
Plojoux et al.

(10) Patent No.: US 12,745,326 B2
(45) Date of Patent: Sep. 22, 2026

(54) ELECTRICALLY HEATED AEROSOL-GENERATING SYSTEM WITH END HEATER

(71) Applicant: Philip Morris Products S.A., Neuchatel (CH)

(72) Inventors: Julien Plojoux, Geneva (CH); Dani Ruscio, Cressier (CH); Olivier Greim, Yverdon-les-Bains (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/480,299

(22) Filed: Oct. 3, 2023

(65) Prior Publication Data

US 2024/0032155 A1 Jan. 25, 2024

Related U.S. Application Data

(63) Continuation of application No. 15/305,139, filed as application No. PCT/EP2015/061318 on May 21, 2015, now Pat. No. 11,930,566.

(30) Foreign Application Priority Data

May 21, 2014 (EP) .................................... 14169342

(51) Int. Cl.
*A24F 40/46* (2020.01)
*A24F 40/50* (2020.01)
(Continued)

(52) U.S. Cl.
CPC ............... *H05B 3/42* (2013.01); *A24F 40/46* (2020.01); *A24F 40/50* (2020.01); *A24F 40/20* (2020.01)

(58) Field of Classification Search
CPC . H05B 3/42; A24F 40/46; A24F 40/50; A24F 40/20
(Continued)

(56) References Cited

U.S. PATENT DOCUMENTS 3,480,461 A 11/1969 Lynge
4,735,217 A 4/1988 Gerth
(Continued)

FOREIGN PATENT DOCUMENTS

CA 2878143 A1 1/2014
CN 101557728 10/2009
(Continued)

OTHER PUBLICATIONS

Combined Chinese Office Action and Search Report issued Nov. 23, 2023 in Chinese Patent Application No. 202110577064.8 (with English Translation), 13 pages.
(Continued)

*Primary Examiner* — Chee-Chong Lee
(74) *Attorney, Agent, or Firm* — Oblon, McClelland, Maier & Neustadt, L.L.P.

(57) ABSTRACT

An electrically heatable aerosol-generating system is provided, including: a heater element including a thermally conductive substrate including a non-stick coating applied over at least a portion of an outer surface of the thermally conductive substrate, the non-stick coating including a superhydrophobic material. A heater element for an electrically heated aerosol-generating system is also provided, the heater element including: a thermally conductive substrate including a non-stick coating applied over at least a portion of an outer surface of the thermally conductive substrate, the non-stick coating including a superhydrophobic material.

8 Claims, 2 Drawing Sheets

(51) Int. Cl.
*H05B 3/42* (2006.01)
*A24F 40/20* (2020.01)

(58) Field of Classification Search
USPC .......................................................... 392/386
See application file for complete search history.

(56) References Cited

U.S. PATENT DOCUMENTS

| | | | | |
|---|---|---|---|---|
| 4,922,901 | A | 5/1990 | Brooks | |
| 5,080,115 | A | 1/1992 | Templeton | |
| 5,144,962 | A | 9/1992 | Counts et al. | |
| 5,388,594 | A | 2/1995 | Counts et al. | |
| 5,591,368 | A | 1/1997 | Fleischhauer et al. | |
| 5,666,977 | A * | 9/1997 | Higgins | A24F 40/48 131/194 |
| 5,694,919 | A * | 12/1997 | Rubsamen | A61M 15/0066 128/200.14 |
| 5,738,865 | A * | 4/1998 | Baichwal | A61K 9/0075 424/440 |
| 5,758,637 | A * | 6/1998 | Ivri | A61M 11/005 128/200.14 |
| 5,819,756 | A * | 10/1998 | Mielordt | A61M 15/06 131/194 |
| 5,840,246 | A * | 11/1998 | Hammons | A61L 9/03 239/54 |
| 5,855,913 | A * | 1/1999 | Hanes | A61K 31/135 424/501 |
| 6,133,357 | A | 10/2000 | Scheckenbach | |
| 8,156,944 | B2 | 4/2012 | Han | |
| 8,191,555 | B2 | 6/2012 | Herbrich et al. | |
| 2002/0146478 | A1 | 10/2002 | Karbach | |
| 2004/0105819 | A1* | 6/2004 | Hale | A61K 31/522 514/263.34 |
| 2006/0027555 | A1 | 2/2006 | Aisenbrey | |
| 2007/0074734 | A1 | 4/2007 | Braunshteyn | |
| 2008/0092912 | A1 | 4/2008 | Robinson et al. | |
| 2009/0095311 | A1 | 4/2009 | Han | |
| 2009/0126745 | A1 | 5/2009 | Hon | |
| 2010/0059070 | A1 | 3/2010 | Potter et al. | |
| 2011/0209717 | A1 | 9/2011 | Han | |
| 2013/0125906 | A1 | 5/2013 | Hon | |
| 2013/0139833 | A1 | 6/2013 | Hon | |
| 2013/0276798 | A1 | 10/2013 | Hon | |
| 2013/0298905 | A1 | 11/2013 | Levin et al. | |
| 2013/0306065 | A1 | 11/2013 | Michel et al. | |
| 2013/0319999 | A1 | 12/2013 | Plojoux et al. | |
| 2014/0069424 | A1 | 3/2014 | Poston et al. | |
| 2014/0130796 | A1 | 5/2014 | Liu | |
| 2014/0209110 | A1 | 7/2014 | Hon | |
| 2015/0040925 | A1 | 2/2015 | Saleem et al. | |
| 2015/0237916 | A1 | 8/2015 | Farine et al. | |
| 2015/0250230 | A1 | 9/2015 | Hon | |
| 2015/0250231 | A1 | 9/2015 | Hon | |
| 2015/0250232 | A1 | 9/2015 | Hon | |
| 2015/0282525 | A1 | 10/2015 | Plojoux et al. | |
| 2017/0188634 | A1 | 7/2017 | Plojoux et al. | |

FOREIGN PATENT DOCUMENTS

| | | | |
|---|---|---|---|
| CN | 101778578 | A | 7/2010 |
| CN | 102551217 | | 7/2012 |
| CN | 102595943 | A | 7/2012 |
| CN | 102753047 | A | 10/2012 |
| CN | 102753048 | A | 10/2012 |
| CN | 103416852 | | 12/2013 |
| CN | 103608619 | A | 2/2014 |
| CN | 203424290 | U | 2/2014 |
| CN | 103619198 | A | 3/2014 |
| DE | 297 13 866 | U1 | 10/1997 |
| DE | 102 12 045 | A1 | 10/2003 |
| DE | 10 2009 029 768 | A1 | 1/2011 |
| EA | 200800994 | A1 | 8/2008 |
| EP | 2 022 349 | A1 | 2/2009 |
| EP | 2 469 969 | A1 | 6/2012 |
| EP | 2 503 912 | | 10/2012 |
| EP | 2 609 821 | A1 | 7/2013 |
| EP | 3 363 307 | A1 | 8/2018 |
| JP | 3-176990 | A | 7/1991 |
| JP | 2003-506190 | | 2/2003 |
| JP | 2009-537119 | A | 10/2009 |
| JP | 2010-520742 | A | 6/2010 |
| JP | 2014-501 433 | A | 1/2014 |
| JP | 2014-500017 | A | 1/2014 |
| JP | 2017-515485 | A | 6/2017 |
| KR | 10-2009-0005139 | A | 1/2009 |
| KR | 10-2012-0139920 | A | 12/2012 |
| KR | 10-2013-0052119 | A | 5/2013 |
| RU | 2132629 | C1 | 7/1999 |
| RU | 2135054 | C1 | 8/1999 |
| RU | 122 000 | U1 | 11/2012 |
| RU | 132 318 | U1 | 9/2013 |
| RU | 2514220 | C2 | 4/2014 |
| TW | 201400038 | A | 1/2014 |
| TW | 201417729 | A | 5/2014 |
| WO | WO 2010/145805 | A1 | 12/2010 |
| WO | WO 2011/063970 | A1 | 6/2011 |
| WO | WO 2012/0174677 | A1 | 12/2012 |
| WO | WO 2013/009883 | A1 | 1/2013 |
| WO | WO 2013/098411 | A1 | 7/2013 |
| WO | WO 2013/160112 | A2 | 10/2013 |
| WO | WO 2014/040988 | A2 | 3/2014 |

OTHER PUBLICATIONS

International Search Report issued Dec. 11, 2015 in PCT/EP2015/061318 filed May 21, 2015.

Written Opinion issued Dec. 11, 2015 in PCT/EP2015/061318 filed May 21, 2015.

European Search Report issued on Jan. 7, 2015 in Patent Application No. EP 14 16 9342.

Extended European Search Report issued Jul. 6, 2018 in Patent Application No. 18166682.7.

Extended European Search Report issued Jul. 10, 2018 in Patent Application No. 18166680.1.

Office Action issued Jul. 2, 2018 in Japanese Patent Application No. 2018-090664 (with English language translation).

Office Action issued Jul. 2, 2018 in Japanese Patent Application No. 2018-090665 (with English language translation).

Combined Office Action and Search Report issued Oct. 19, 2018 in Russian Patent Application No. 2016149159 with English translation, 14 pages.

Chinese Office Action issued on Dec. 5, 2018 in Patent Application No. 201580020463.7 (with English translation), 11 pages.

Japanese Office Action issued Apr. 1, 2019 in Japanese Patent Application No. 2018-090664 (with English translation), 9 pages.

Office Action issued Jun. 13, 2019 in Japanese Patent Application No. 2016-567995, 4 pages.

Office Action issued Jul. 22, 2019 in Chinese Patent Application No. 201580020463.7, 19 pages (with English translation).

Chinese Search Report issued Mar. 25, 2020 in Chinese Application No. 2015800204637 (with English Translation).

Chinese Office Action issued Mar. 25, 2020 in Chinese Application No. 2015800204637 (with English Translation.

Chinese Office Action and Search report issued Apr. 27, 2020 in corresponding Chinese Patent Application No. 201810360775.8 (with English translation), 14 pages.

Chinese Office Action and Search Report issued May 7, 2020 in corresponding Chinese Patent Application No. 201810362563.3 (with English translation), 14 pages.

Japanese Decision to Grant issued Oct. 15, 2020 in corresponding Japanese Patent Application No. 2018-090665 (with English Translation), 5 pages.

Combined Chinese Office Action and Search Report issued Jan. 22, 2021 in Chinese Patent Application No. 201810362563.3 (with English translation), 13 pages.

"Thermal Spraying Material", Technical Manual of Materials for Machinery Manufacturing, the second volume, edited by the Editing Group, China Machine Press, pp. 652-653, Dec. 1993.

(56) References Cited

OTHER PUBLICATIONS

Combined Russian Office Action and Search Report issued Sep. 13, 2021 in corresponding Russian Patent Application No. 2018118776 (with English translation), 14 pages.
Combined Chinese Office Action and Search Report issued Aug. 4, 2021 in corresponding Chinese Patent Application No. 2018103625633 (with English translation), 19 pages.
Combined Chinese Office Action and Search Report issued Aug. 13, 2021 in corresponding Chinese Patent Application No. 201810360775.8 (with English translation), 28 pages.
Extended European Search Report issued Nov. 18, 2021 in corresponding European Patent Application No. 21195399.7, 9 pages.
Search Report dated Jan. 16, 2022, issued in corresponding Chinese patent application No. 201810362563.3.
Office Action dated Jan. 21, 2022, issued in corresponding Chinese patent application No. 201810362563.3 (with English translation).
Korean Office Action mailed Apr. 20, 2024 in corresponding Korean Patent Application No. 10-2024-7005055 (with English translation), 7 pgs.
Combined Chinese Office Action and Search Report issued Jun. 29, 2024, in corresponding Chinese Patent Application No. 202110577064.8 (with English Translation), 12 pages.
Yuankang Xu, Design of Molds for Plastic Articles, Beijing: China Machine Press, 1968, pp. 84-85 and cover page.
Office Action and Search Report dated Sep. 11, 2025 issued in corresponding Russian Patent Application No. 2022111144 (with English translation).

* cited by examiner

ELECTRICALLY HEATED AEROSOL-GENERATING SYSTEM WITH END HEATER

CROSS-REFERENCE TO RELATED APPLICATIONS

This application is a continuation of and claims benefit under 35 U.S.C. § 120 to U.S. application Ser. No. 15/305,139, filed Oct. 19, 2016, which is a U.S. National Stage application of PCT/EP2015/061318, filed on May 21, 2015, and claims the benefit of priority under 35 U.S.C. § 119 from EP 14169342.4, filed on May 21, 2014, respectively, the entire contents of each of which are incorporated herein by reference.

The present invention relates to an electrically heated aerosol-generating system and a method of controlling the formation of an aerosol in an electrically heated aerosol generating system. The invention finds particular application as an electrically operated smoking system and a method of forming an aerosol in an electrically operated smoking system.

Electrically operated smoking systems commonly include a resistive heater element that is used to heat a tobacco material in a cigarette, for example. However, known electrically operated smoking systems typically use complex heater elements that may be costly to manufacture and, in some cases, may cause at least part of the cigarette to become stuck in the system when a consumer attempts to remove the cigarette. It would therefore be desirable to provide a novel electrically heated aerosol-generating system that is simple in design and cost effective to manufacture.

According to a first aspect, the present invention provides an electrically heated aerosol-generating system for receiving an aerosol-forming article. The system comprises a tubular portion for receiving an aerosol-forming article and a heater element comprising an end face. The heater element is positioned proximate an end of the tubular portion so that the end face is proximate an end of an aerosol-forming article when the aerosol-forming article is inserted into the tubular portion. The system further comprises an annular thermally conductive element provided on an inner surface of the tubular portion, the annular thermally conductive element comprising a first portion connected to the heater element and a second portion arranged to contact an aerosol-forming article when the aerosol-forming article is inserted into the tubular portion. The system is configured to supply a first amount of electrical energy to the heater element to heat the heater element to a first temperature and to supply a second amount of electrical energy to the heater element to maintain the heater element at a second temperature. The second temperature is lower than the first temperature and the difference between the first and second temperatures is at least about 100 degrees Celsius.

The term “aerosol-forming article” is used herein to mean an article comprising at least one substrate that forms an aerosol when heated. As known to those skilled in the art, an aerosol is a suspension of solid particles or liquid droplets in a gas, such as air. The aerosol may be a suspension of solid particles and liquid droplets in a gas, such as air.

By utilising a heater element that is positioned proximate an end of an aerosol-forming article, the system according to the present invention can advantageously eliminate the need for a heater element that is inserted into or around a portion of the aerosol-forming article. The system according to the present invention can therefore reduce the risk of a portion of the aerosol-forming article becoming stuck in the system when a consumer attempts to remove the article.

Furthermore, since the system according to the present invention requires a heater element having only an end face positioned proximate the aerosol-forming article, the system can utilise a simple heater design that is simple and cost effective to manufacture.

Advantageously, the annular thermally conductive element assists the conduction of heat from the heater element into an aerosol-forming article when the aerosol-forming article is inserted into the tubular portion. The first portion may be connected directly to the heater element so that the annular thermally conductive element is in direct contact with the heater element. Alternatively, the first portion may be indirectly connected to the heater element via one or more intervening thermally conductive elements.

For ease of construction, the annular thermally conductive element preferably comprises a metal sheet or sleeve that is secured to the inner surface of the tubular portion. For example, the annular thermally conductive element may be formed from a metal foil, such as aluminium.

By heating the heater element to a first temperature and then maintaining the heater element at a lower second temperature, wherein the difference between the first and second temperature is at least about 100 degrees Celsius, the system according to the present invention can provide improved control over the heating of an aerosol-forming article using the heater element positioned proximate an end of the aerosol-forming article. In particular, the higher first temperature advantageously provides an initial “boost” to reduce the time required to heat an aerosol-forming article to a required operating temperature, whereas the lower second temperature maintains the operating temperature of the aerosol-forming article. Therefore, the first temperature will typically be significantly higher than the operating temperature of the aerosol-forming article and the second temperature will typically be similar to the operating temperature of the aerosol-forming article. The difference between the first and second temperatures may be at least about 150 degrees Celsius. The first temperature may be at least about 400 degrees Celsius, preferably at least about 450 degrees Celsius. The second temperature may be at least about 250 degrees Celsius, preferably at least about 300 degrees Celsius.

Preferably, the second temperature is lower than the first temperature. The higher first temperature advantageously provides an initial “boost” to reduce the time required to heat an aerosol-forming article to a required operating temperature, whereas the lower second temperature maintains the operating temperature of the aerosol-forming article. Therefore, the first temperature will typically be significantly higher than the operating temperature of the aerosol-forming article and the second temperature will typically be similar to the operating temperature of the aerosol-forming article. For example, the first temperature may be at least about 400 degrees Celsius, preferably at least about 450 degrees Celsius. The second temperature may be at least about 250 degrees Celsius, preferably at least about 300 degrees Celsius.

The end face of the heater element may heat an aerosol-forming article inserted into the system by means of conduction. For example, the heater element may be at least partially in contact with the aerosol-forming article. Alternatively, the heat from the heater element may be conducted to the aerosol-forming article by means of a heat conductive element. Alternatively, the heater element may transfer heat to the incoming ambient air that is drawn through the electrically heated aerosol-generating system during use, which in turn heats the aerosol-forming article by convection.

The heater element preferably comprises a thermally conductive substrate having a substantially cylindrical shape or a disc shape. Additionally, or alternatively, the end face of the heater element is preferably substantially circular.

The thermally conductive substrate preferably has a thermal conductivity of at least about 15 watts per metre kelvin. Additionally, or alternatively, the thermally conductive substrate preferably has a thermal conductivity of less than about 450 watts per metre kelvin. Most preferably, the thermally conductive substrate has a thermal conductivity of between about 15 watts per metre kelvin and about 450 watts per metre kelvin. For example, the thermally conductive substrate can be formed from a metal or a ceramic.

Additionally, or alternatively, the thermally conductive substrate can be formed from an electrically conductive material, such as a metal or an electrically conductive ceramic. Forming the thermally conductive substrate from an electrically conductive material can simplify the construction of the heater element by facilitating direct resistive heating of the heater element by conducting an electrical current through the thermally conductive substrate. Alternatively, a separate electrically conductive element, such as a wire coil, can be provided inside the thermally conductive substrate to effect indirect heating of the thermally conductive substrate.

The thermally conductive substrate may comprise a non-stick coating applied over at least a portion of an outer surface of the thermally conductive substrate, and at least over the end face. The non-stick coating helps to prevent parts of an aerosol-forming article sticking to the heater element. For example, in those embodiments in which a tobacco-based aerosol-forming article is inserted into the aerosol-forming system, the non-stick coating may prevent tobacco sticking to the heater element. Suitable non-stick coating materials include polytetrafluoroethylene (PTFE), glass, and superhydrophobic materials that exhibit the so-called 'lotus effect'.

In any of the embodiments described above the system may further comprise a supply of electrical energy connected to the heater element to resistively heat the heater element when the system is activated. The supply of electrical energy may be a rechargeable battery, such as a lithium-ion battery or one of its variants, for example a lithium-ion polymer battery. Alternatively, the power supply may be a nickel-metal hydride battery or a nickel cadmium battery or a fuel cell. Preferably, the aerosol-generating system comprises electrical hardware configured to control the supply of electrical energy to the heater element. The electrical hardware may be programmable using software on an external device.

In any of the embodiments described above, the electrically heated aerosol-generating system may further comprise one or more thermally insulating materials to reduce heat loss from the heater element and to protect a user from burning. For example, the electrically heated aerosol-generating system may comprise a thermally insulating material provided between the heater element and an outer housing forming the tubular portion.

Thermally insulating materials must not degrade at the high temperatures reached by the heater element. Preferably, the thermally insulating material comprises a metal or another non-combustible material. In one example, the metal is gold. In another example, the metal is silver. A metal is advantageous as it may reflect heat back into the electrically heated aerosol-generating system.

Preferably, the thermally insulating material comprises a plurality of air cavities. The air cavities may be arranged in a regular pattern. In one preferred embodiment, the air cavities are hexagonal and arranged in a honeycomb structure. The material used to form the air cavities is preferably a metal or another non-combustible material, as described above.

The electrically heated aerosol-generating system may further comprise a sensor to detect air flow indicative of a consumer taking a puff. The air flow sensor may be an electro-mechanical device. Alternatively, the air flow sensor may be any of: a mechanical device, an optical device, an opto-mechanical device and a micro electro-mechanical systems (MEMS) based sensor. Alternatively, the electrically heated aerosol-generating system may comprise a manually operable switch for a consumer to initiate a puff.

Additionally, or alternatively, the electrically heated aerosol-generating system may further comprise a temperature sensor. The temperature sensor may detect the temperature of the heater element or the temperature of the aerosol-forming article. The temperature sensor may be a thermistor. Alternatively, the temperature sensor may comprise a circuit configured to measure the resistivity of the heater element and derive a temperature of the heater element by comparing the measured resistivity to a calibrated curve of resistivity against temperature.

Preferably, the electrically heated aerosol-generating system further comprises an indicator for indicating when the heater element is activated. The indicator may comprise a light, activated when the heater element is activated.

In some embodiments, the heater element having the end face proximate the end of the aerosol-forming article is the only heater element in the aerosol-generating system. Utilising only a single heater element can further simplify the manufacture of the system and reduce cost.

According to a second aspect, the present invention provides a method of controlling the formation of an aerosol in an electrically heated aerosol generating system, in accordance with the first aspect of the invention, the electrically heated aerosol generating system further comprising an aerosol-forming article. The method comprises a step of supplying electrical energy from the supply of electrical energy to the heater element to resistively heat the heater element to a first temperature. The supply of electrical energy to the heater element is then reduced so that the heater element cools to a second temperature lower than the first temperature, wherein the difference between the first and second temperatures is at least about 100 degrees Celsius. The supply of electrical energy to the heater element is then controlled to maintain the heater element at the second temperature.

Advantageously, the method according to the present invention provides a simple and effective means of controlling an electrically heated aerosol generating system having a relatively simple heater design. Heating the heater element to a higher first temperature advantageously provides an initial "boost" to reduce the time required to heat the aerosol-forming article to a required operating temperature, whereas the lower second temperature maintains the operating temperature of the aerosol-forming article. For example, the first temperature may be at least about 400 degrees Celsius, preferably at least about 450 degrees Celsius. The second temperature may be at least about 250 degrees Celsius, preferably at least about 300 degrees Celsius. The step of controlling the supply of electrical energy to maintain the heater element at the second temperature may comprise the steps of measuring the resistivity of the heater element, deriving a present temperature of the heater element from the measured resistivity, and adjusting the supply of electrical energy to the heater element to reduce any difference between the present temperature and the second temperature.

The difference between the first and second temperatures is preferably at least about 150 degrees Celsius.

In accordance with both aspects of the invention, the aerosol-forming article includes an aerosol-forming substrate that preferably comprises a tobacco-containing material containing volatile tobacco flavour compounds which are released from the substrate upon heating. The aerosol-forming substrate may comprise a non-tobacco material. The aerosol-forming substrate may comprise tobacco-containing material and non-tobacco containing material.

Preferably, the aerosol-forming substrate further comprises an aerosol former. Examples of suitable aerosol formers are glycerine and propylene glycol.

The aerosol-forming substrate is preferably a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco such as extruded tobacco, and expanded tobacco. The solid substrate may be in loose form, or may be provided in a suitable container or cartridge. Optionally, the solid substrate may contain additional tobacco or non-tobacco volatile flavour compounds, to be released upon heating of the substrate.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The smoking article may have a total length between approximately 30 mm and 100 mm. The smoking article may have an external diameter between approximately 5 mm and approximately 13 mm. The smoking article may comprise a filter plug. The filter plug may be located at the downstream end of the smoking article. The filter plug may be a cellulose acetate filter plug. The filter plug is preferably approximately 7 mm in length, but can have a length of between approximately 5 mm to approximately 10 mm.

Preferably, the smoking article is a cigarette. In a preferred embodiment, the smoking article has a total length between 40 mm and 50 mm. Preferably, the smoking article has a total length of approximately 45 mm. It is also preferable for the smoking article to have an external diameter of approximately 7.2 mm. Preferably, the aerosol-forming substrate comprises tobacco. Further, the aerosol-forming substrate may have a length of approximately 10 mm. However it is most preferable for the aerosol-forming substrate to have a length of 12 mm.

Further, the diameter of the aerosol-forming substrate may also be between approximately 5 mm and approximately 12 mm.

The smoking article may comprise an outer paper wrapper.

Further, the smoking article may comprise a separation between the aerosol-forming substrate and the filter plug. The separation may be approximately 18 mm, but can be in the range of approximately 5 mm to approximately 25 mm.

The aerosol-forming substrate may alternatively be a liquid substrate. The aerosol-forming substrate may alternatively be any other sort of substrate, for example, a gas substrate, or any combination of the various types of substrate.

During operation, the aerosol-forming article may be completely contained within the electrically heated aerosol-generating system. In that case, a user may puff on a mouthpiece of the electrically heated aerosol-generating system. Alternatively, during operation, the aerosol-forming article may be partially contained within the electrically heated aerosol-generating system and the user may puff directly on the article.

The invention will now be further described, by way of example only, with reference to the accompanying drawings, in which.

Figure 1:
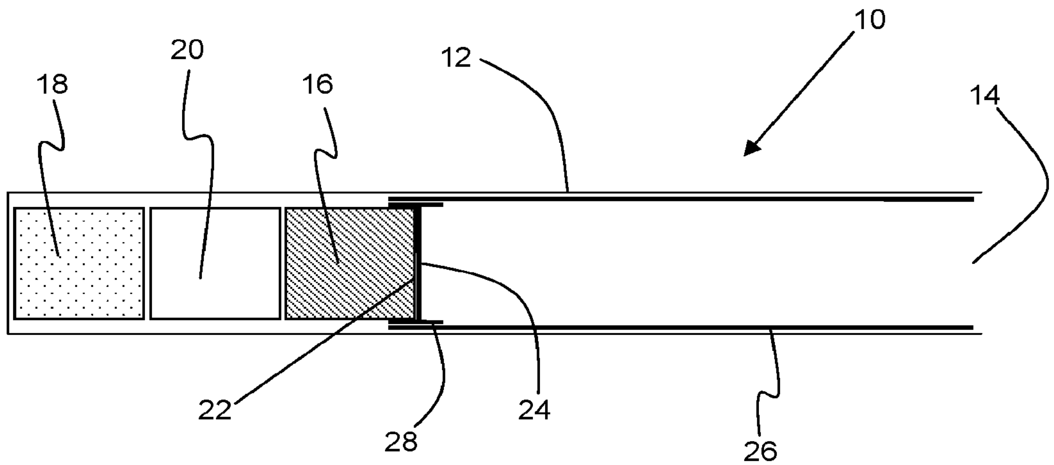
FIG. 1 shows a schematic view of an electrically heated aerosol-generating system in accordance with the present invention.

FIG. 1 shows an electrically heated aerosol-generating system 10 in accordance with the present invention. The system 10 comprises a tubular housing 12 having an opening 14 at one end (also referred to as a tubular portion) for receiving an aerosol-forming article. At the opposite end of the tubular housing 12 is a substantially cylindrical heater element 16, a rechargeable battery 18 for powering the heater element 16, and control electronics 20 for controlling the operation of the system 10. The control electronics 20 control the switching on and off of the system 10, the power supplied from the rechargeable battery 18 to the heater element 16 and the charging of the rechargeable battery 18 when the battery is connected to an external power supply.

A substantially circular end face 22 of the heater element 16 is covered by an aluminium patch 24 (also referred to as an annular thermally conductive element) to provide efficient heat transfer from the heater element 16 into the upstream end of the aerosol-forming article. An aluminium sheath 26 lines the inner surface of the tubular housing 12 from the downstream end of the heater element 16 to the opening 14. The aluminium sheath 26 provides improved heat transfer from the heater element 16 towards the downstream end of the aerosol-forming article. An annular portion 28 of the aluminium patch 24 provides efficient heat transfer from the heater element 16 to the aluminium sheath 26. Annular portion 28 is shown in FIGS. 1 and 3 with a first portion thereof extending to the left of end face 22 and being in contact with heater element 16, and with a second portion thereof extending to the right of end face 22 and being arranged to contact an aerosol-forming article, e.g., aerosol-forming article 30 as shown in FIG. 3.

Figure 2:
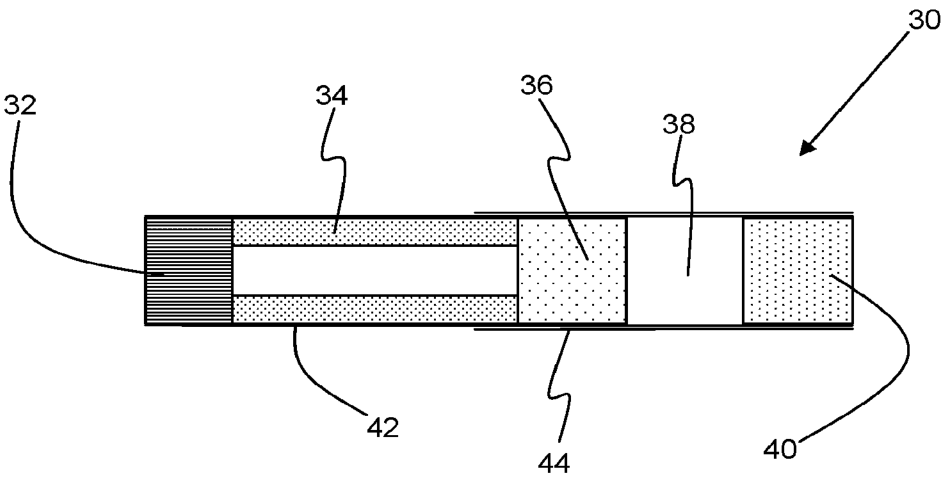
FIG. 2 shows a longitudinal cross-section through an aerosol-forming article for use in the electrically heated aerosol-generating system of FIG. 1.

FIG. 2 shows an aerosol-forming article 30 for use with the electrically operated aerosol-generating system 10 of FIG. 1. The aerosol-forming article 30 is a smoking article comprising a tobacco plug 32 provided at an upstream end of the article 30. Downstream of the tobacco plug 32 is an annular diffuser 34 that facilitates the formation of an aerosol from the tobacco plug 32 when the tobacco plug 32 is heated.

Downstream of the diffuser 34 is a mouthpiece comprising an upstream filter segment 36, a cavity 38 and a downstream filter segment 40. Each of the filter segments 36, 40 can comprise a conventional filter material, such as cellulose acetate. An outer wrapper 42 surrounds the components of the aerosol-forming article 30 to maintain the components in axial alignment and a tipping wrapper 44 is wrapped around the mouth end of the article 30 to provide an appearance similar to that of a conventional cigarette.

Figure 3:
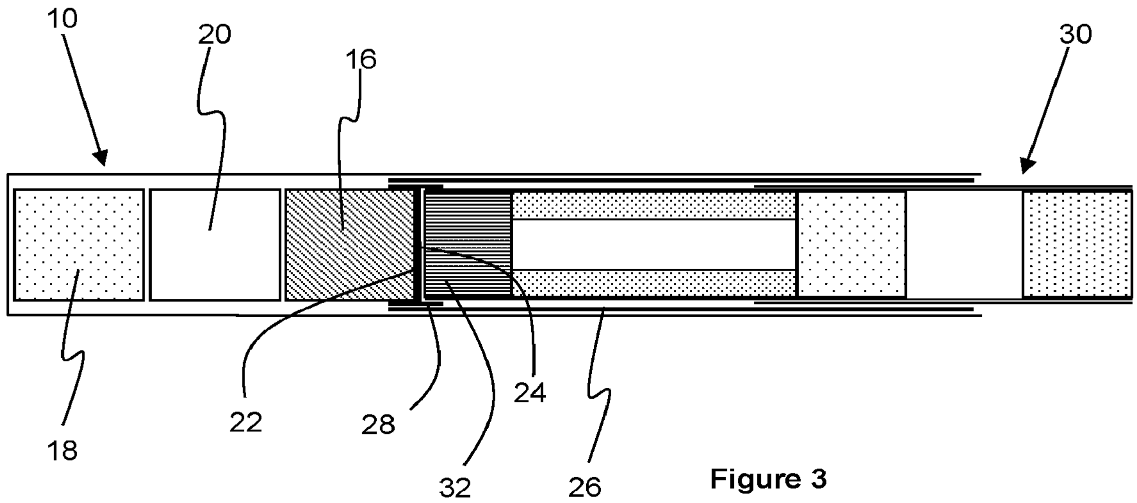
FIG. 3 shows the aerosol-forming article of FIG. 2 inserted into the electrically heated aerosol-generating system of FIG. 1.

FIG. 3 shows the aerosol-forming article 30 inserted into the electrically operated aerosol-generating system 10. The tobacco plug 32 is positioned proximate the substantially circular end face 22 of the heater element 16 so that the tobacco plug 32 is heated to form an aerosol. A consumer draws on the mouth end of the article 30 to draw the aerosol through the article 30 and into the mouth. A number of air inlets (not shown) may be provided in the tubular housing 12 to allow air to flow into the aerosol-generating system when the consumer draws on the mouth end of the article 30. For example, the air inlets may be positioned such that they overly the tobacco plug 32 when the article 30 is fully inserted into the system 10. Additionally, or alternatively, the air inlets may be positioned so that they overly the diffuser 34 when the article is full inserted into the system 10. In such embodiments, the diffuser 34 is preferably configured to direct incoming airflow upstream into the tobacco plug 32 before channelling the airflow from the tobacco plug 32 back through a central portion of the diffuser 34 towards the mouth end of the article 30.

During operation of the system 10, the control electronics 20 initialises the heater element 16 by passing a current from the rechargeable battery 18 through the heater element 16. The control electronics 20 monitors the temperature of the heater element 16 and maintains the current until a first temperature is reached. Upon reaching the first temperature the control electronics 20 reduces the current to the heater element 16 until the temperature of the heater element 16 drops to a second temperature. Once the temperature of the heater element 16 has reached the lower, second temperature the control electronics 20 continues to monitor the temperature of the heater element 16 and makes any necessary adjustments to the current supplied to the heater element 16 to maintain the second temperature. The control electronics 20 will switch off the supply of current to the heater element 16 after a predetermined period of time at which the article 30 is deemed consumed, or when the consumer stops puffing on the article 30 if sooner.

The invention claimed is:

1. An electrically heatable aerosol-generating system configured to heat an aerosol-forming article inserted into the electrically heated aerosol-generating system, the electrically heatable aerosol-generating system comprising:

a tubular portion configured to receive the aerosol-forming article; and a heater element comprising a thermally conductive substrate and a substantially circular end face, wherein a non-stick coating is applied at least over the substantially circular end face of the heater element, wherein the heater element is positioned proximate an end of the tubular portion, wherein the substantially circular end face is configured to be positioned proximate to a tobacco plug provided at an upstream end of the aerosol-forming article when the aerosol-forming article is inserted into the system to heat the tobacco plug by means of conduction to form an aerosol, and wherein the non-stick coating includes a superhydrophobic material.

2. The electrically heatable aerosol-generating system according to claim 1, wherein the non-stick coating includes polytetrafluoroethylene (PTFE).

3. The electrically heatable aerosol-generating system according to claim 1, wherein the non-stick coating includes glass.

4. The electrically heatable aerosol-generating system according to claim 1, wherein the thermally conductive substrate comprises a metal or an electrically conductive ceramic.

5. The electrically heatable aerosol-generating system according to claim 1, further comprising a supply of electrical energy connected to the heater element to resistively heat the heater element when the electrically heatable aerosol-generating system is activated.

6. The electrically heatable aerosol-generating system according to claim 1, wherein the heater element is the only heater element in the electrically heatable aerosol-generating system.

7. The electrically heatable aerosol-generating system according to claim 1, wherein the heater element is substantially cylindrical.

8. The electrically heatable aerosol-generating system according to claim 1, wherein aerosol-generating system further comprises an annular thermally conductive element provided on an inner surface of the tubular portion.

* * * * *